(12) United States Patent
Volk et al.

(10) Patent No.: US 12,180,016 B2
(45) Date of Patent: Dec. 31, 2024

(54) HANDLING DEVICE

(71) Applicant: Schaeffler Technologies AG & Co. KG, Herzogenaurach (DE)

(72) Inventors: Wolfgang Volk, Frensdorf (DE); Klaus Sattler, Diespeck (DE)

(73) Assignee: Schaeffler Technologies AG &Co.KG, Herzogenaurach (DE)

(*) Notice: Subject to any disclaimer, the term of this patent is extended or adjusted under 35 U.S.C. 154(b) by 306 days.

(21) Appl. No.: 17/797,108

(22) PCT Filed: Feb. 5, 2021

(86) PCT No.: PCT/DE2021/100112
§ 371 (c)(1),
(2) Date: Aug. 3, 2022

(87) PCT Pub. No.: WO2021/160214
PCT Pub. Date: Aug. 19, 2021

(65) Prior Publication Data
US 2023/0053613 A1    Feb. 23, 2023

(30) Foreign Application Priority Data
Feb. 11, 2020    (DE) .................. 10 2020 103 411.3

(51) Int. Cl.
*B65G 47/244* (2006.01)
*B65G 47/84* (2006.01)

(52) U.S. Cl.
CPC .................................. *B65G 47/84* (2013.01)

(58) Field of Classification Search
CPC .... B65G 47/244; B65G 47/84; B65G 47/843; B65G 47/848

(Continued)

(56) References Cited

U.S. PATENT DOCUMENTS 3,978,968 A * 9/1976 Rose ................... F41A 9/02
198/339.1
5,158,168 A * 10/1992 Bedin ................. B67C 7/002
198/465.1

(Continued)

FOREIGN PATENT DOCUMENTS

CN         1942362 A      4/2007
CN      200945938 Y       9/2007

(Continued)

OTHER PUBLICATIONS

US 2004/0124068 A1, Jul. 1, Berndtsson (Year: 2004).*
US 2023/0329921 A1, Oct. 19, Adams et al. (Year: 2023).*

*Primary Examiner* — Douglas A Hess

(57) ABSTRACT

A handling device for transferring workpieces includes a workpiece carrier arranged to receive workpieces and a rotatable workpiece-conveying apparatus arranged to receive the workpieces from the workpiece carrier in a first angular position and to transfer the workpieces to a storage station in a second angular position. The workpiece-conveying apparatus includes an axis of rotation, a first linearly displaceable feed element and a second linearly displaceable feed element, intersecting the first feed element at the axis of rotation and simultaneously actuatable with the first feed element. The apparatus also includes first and second non-rotatable linear actuators. The first and second feed elements have end pieces, each arranged for direct interaction with the workpiece and a respective linear actuator. The feed elements may intersect at an angle of 90°. The first feed element may have a straight shape and the second feed element may have an offset shape.

18 Claims, 2 Drawing Sheets

(58) Field of Classification Search
USPC .......................................................... 198/608
See application file for complete search history.

(56) References Cited

U.S. PATENT DOCUMENTS

| | | | | |
|---|---|---|---|---|
| 7,942,256 | B2* | 5/2011 | Coates .................. | B21D 51/26 |
| | | | | 198/441 |
| 9,033,132 | B2* | 5/2015 | Goeb .................. | B65G 47/848 |
| | | | | 198/608 |
| 10,494,197 | B2* | 12/2019 | Schneider ............ | B65H 29/241 |
| 10,513,359 | B2* | 12/2019 | Van Den Brink ... | B65G 47/842 |
| 10,987,254 | B2* | 4/2021 | Arima ................ | A61F 13/15764 |
| 11,155,420 | B2* | 10/2021 | Schulz ................ | B65G 47/848 |
| 11,167,934 | B2* | 11/2021 | Viola .................. | B65G 47/244 |
| 11,292,286 | B2* | 4/2022 | Brechling ............. | B21D 22/02 |
| 11,887,876 | B2* | 1/2024 | Han .................... | B65G 47/848 |
| 12,037,205 | B2* | 7/2024 | Piantoni ............ | A61F 13/15764 |
| 2013/0074317 | A1 | 3/2013 | Weber | |

FOREIGN PATENT DOCUMENTS

| | | |
|---|---|---|
| CN | 200973929 Y | 11/2007 |
| CN | 104755224 A | 7/2015 |
| CN | 104801496 A | 7/2015 |
| CN | 109866071 A | 6/2019 |
| DE | 8714508 U1 | 12/1987 |
| DE | 3723822 A1 | 1/1989 |
| DE | 4039046 A1 | 6/1992 |
| DE | 19625846 A1 | 6/1997 |
| DE | 102006018590 A1 | 10/2007 |
| DE | 102010021983 A1 | 12/2011 |
| DE | 102007050905 B4 | 8/2015 |
| DE | 102017117946 B3 | 8/2018 |
| DE | 102020103411 A1 | 8/2021 |
| EP | 0453710 A2 | 10/1991 |
| EP | 2010758 B1 | 7/2015 |

* cited by examiner

HANDLING DEVICE

CROSS-REFERENCE TO RELATED APPLICATIONS

This application is the United States National Phase of PCT Appln. No. PCT/DE2021/100112 filed Feb. 5, 2021, which claims priority to German Application No. DE1020201034111.3 filed Feb. 11, 2020, the entire disclosures of which are incorporated by reference herein.

TECHNICAL FIELD

The present disclosure relates to a handling device for transferring workpieces. The present disclosure further relates to a method for transferring workpieces.

BACKGROUND

Various handling devices are known from the documents DE 10 2006 018 590 A1 and DE 10 2007 050 905 B4, which can be used for handling parts within a production plant. In both cases, a platform on which objects can be placed and displaced is arranged horizontally in every operating state of the relevant handling device.

DE 40 39 046 A1 discloses a modular, multi-axis and mobile system for handling and processing, which is intended as a manufacturing alternative to rotary indexing tables and includes what is termed a turret head, which can be moved with the aid of an angle drive.

A rotary indexing table machining center is known, for example, from DE 87 14 508 U1. The rotary indexing table of this machining center carries a plurality of workpiece clamping units arranged at equal angular distances on its circumference. Spindle units are assigned to the workpiece clamping units, wherein at least one of the spindle units is displaceable in three axes.

DE 37 23 822 A1 discloses a driver clamping device for the machining of cylinder tubes on keyseating machines with a rotary indexing table. In this case, a clamping device having a plurality of clamping slides distributed around the axis of rotation is arranged on a height-adjustable turntable. The ends of the clamping slides run against a conically turned clamping ring that is held in place on a machine frame.

SUMMARY

The present disclosure specifies options for handling workpieces that are further developed than in the prior art, wherein the workpieces change their orientation during transfer, in particular from a horizontal orientation to a vertical orientation. The configurations and advantages explained below in connection with the transferring method also apply accordingly to the handling device and vice versa.

The handling device includes a workpiece carrier, which is designed to receive a plurality of workpieces, and a rotatable workpiece-conveying apparatus that can be operated in a clocked manner, which is designed to transfer the workpieces to a storage station. The workpiece-conveying apparatus is designed to receive workpieces from the workpiece carrier in a first angular position and to transfer them to the storage station in a second angular position and comprises at least two linearly displaceable feed elements.

The geometric displacement axes of the feed elements intersect in the axis of rotation of the workpiece-conveying apparatus. A plurality of these feed elements, e.g., all of the feed elements, can be moved simultaneously, wherein each individual feed element is assigned a stationary linear actuator that does not rotate with the workpiece-conveying apparatus for this purpose. Each feed element has two end pieces of the same type, each end piece being provided for direct interaction with a workpiece or for direct interaction with a linear actuator, depending on the angular situation of the workpiece-conveying apparatus.

This means that during a full revolution of the workpiece-conveying apparatus, each end piece performs the function of a gripper end, which faces a workpiece, at least once, e.g., several times, and additionally at least once, e.g., also several times, the function of an actuator end, which faces a linear actuator. The end pieces of the feed elements are also referred to as product grippers.

In an example embodiment, the two ends of each feed element have the function of a gripper end twice in succession when the workpiece-conveying apparatus system is cycled on, which means that a workpiece is first gripped or then released, and then twice in succession the function of an actuator end, which each linear actuator is facing, which moves the feed element in question. In a typical configuration, a plane is spanned by the displacement axes of the feed elements, to which the axis of rotation of the workpiece-conveying apparatus represents a surface normal.

In an example embodiment, the axis of rotation of the workpiece-conveying apparatus, which adopts at least the basic features of a rotary table, e.g., a rotary indexing table, is aligned horizontally. The number of feed elements to be attributed to the workpiece-conveying apparatus is not subject to any fundamental restrictions. In a typical configuration, the workpiece-conveying apparatus includes exactly two feed elements intersecting at right angles. Regardless of the number of feed elements, these are designed in such a way that the geometric feed axes intersect at a point lying on the axis of rotation of the workpiece-conveying apparatus. This can be achieved by cranking at least one feed element. A further feed element, on the other hand, has a straight shape throughout. In order to enable the displaceability of all feed elements, one of the feed elements can, for example, also have a recess in the faint of an elongated hole instead of an offset.

Irrespective of whether an individual feed element has an offset or recess, the two ends of each feed element, i.e., the end pieces, which function as a gripper end or as an actuator end depending on the operating state, are optionally interchangeable to enable adaptation to different workpieces. The workpieces to be conveyed are, for example, components of valve trains for internal combustion engines, for example hydraulic support elements. Reference is made in this context, for example, to the documents DE 10 2017 117 946 B3 and EP 2 010758 B1.

The grippers of the feed elements may be designed as pneumatic grippers, namely vacuum grippers. Vacuum grippers are known in principle from a wide variety of technical fields, DE 196 25 846 A1 being mentioned as an example. In the present case, the vacuum grippers, which are located on the moving elements, namely the feed elements, are flying vacuum grippers. The air duct to the vacuum grippers is designed as a rotating air duct through the workpiece-conveying apparatus, i.e., the indexing table.

A plurality of linear guides distributed uniformly around the circumference of the workpiece-conveying apparatus may be provided for guiding the feed elements. In an example embodiment, which enables a high geometric precision, the guide elements, which are used for the linear guidance of the feed elements, are designed in one piece with a rotatable round plate, i.e., the turntable in the narrower sense. The individual linear guides, which in this case are designed as slide bearings, can be designed as bores through which the essentially rod-shaped feed elements are inserted. Alternatively, the feed elements can be supported by linear roller bearings.

With regard to the bearing of the rotary indexing table, various fundamentally known technical principles, e.g., a roller bearing, can also be considered. The rotary indexing table can be driven either as a direct drive, i.e., gearless, or via a gear. Devices for detecting the angular position of the rotary indexing table can be provided on the rotary indexing table itself and/or on its drive device. Together with the exact guidance of the feed elements, a high positioning accuracy of the handling device can be achieved overall.

The linear actuators, which are used to move the feed elements, may be designed exclusively for exerting compressive forces, i.e., for moving in only one direction. The displacement in the opposite direction, i.e., the return stroke of the feed elements, may be carried out with the help of springs. Helical springs are suitable for this purpose, which are supported, for example, on elements of the linear guides, with each feed element being surrounded by two helical springs and also providing supports for the springs or being firmly connected to such supports.

A rotary table is suitable as a workpiece carrier that feeds parts to the rotary indexing table. In a simple case, the turntable is a rotating plate in which there are several recesses, each of which is provided for receiving a workpiece. The number of recesses may correspond to a multiple of the number of feed elements. For example, there are eight or twelve receptacles in the workpiece carrier, each for one workpiece. In the case of two feed elements, this means that a further rotation of the workpiece-conveying apparatus by 90°, i.e., a further indexing by one cycle, is accompanied by a further rotation of the workpiece carrier by 45° or 30°.

The handling method that can be carried out with the rotary indexing table includes the following steps, regardless of the design of the workpiece carrier:

Providing a workpiece-conveying apparatus designed as a rotary indexing table with a horizontal axis of rotation with two linearly displaceable feed elements intersecting one another on the axis of rotation, Simultaneously removing a first workpiece in a first angular position from a workpiece carrier by means of the first feed element and transferring a similar workpiece in an angular position tilted by 90° by the second feed element to a storage station, Further rotating the rotary indexing table by 90° and receiving a further workpiece from the workpiece carrier by means of the second feed element while simultaneously transferring the first workpiece received in the previous step to the storage station by means of the first feed element.

The actuators, which are arranged in a stationary manner outside of the rotary indexing table and move the feed elements, which are present in a corresponding number, do not necessarily have a uniform stroke. In the case of exactly two feed elements, one of the actuators may always perform a horizontal stroke and the other actuator may always perform a vertical stroke, and a workpiece is received from the workpiece carrier by the vertical stroke and a workpiece is simultaneously transferred from the workpiece-conveying apparatus to a downstream device, which is to be assigned to the storage station, by the horizontal stroke.

A high number of cycles of the handling device can be achieved by the fact that a plurality of workpieces to be conveyed and thereby to be tilted are received by the workpiece carrier at the same time by the workpiece-conveying apparatus and transferred to the storage station. In an example embodiment, the handling device is designed for a transfer of more than 60 parts per minute. For example, a cycle of 70/min is achieved by receiving or transferring a workpiece a total of 140 times per minute, and the number of 70 cycles corresponds to exactly 17.5 revolutions of the rotary indexing table.

BRIEF DESCRIPTION OF THE DRAWINGS

In the following, an exemplary embodiment of the invention is explained in more detail by means of a drawing. In a partly roughly schematized manner in the figures.

DETAILED DESCRIPTION

Figure 1:
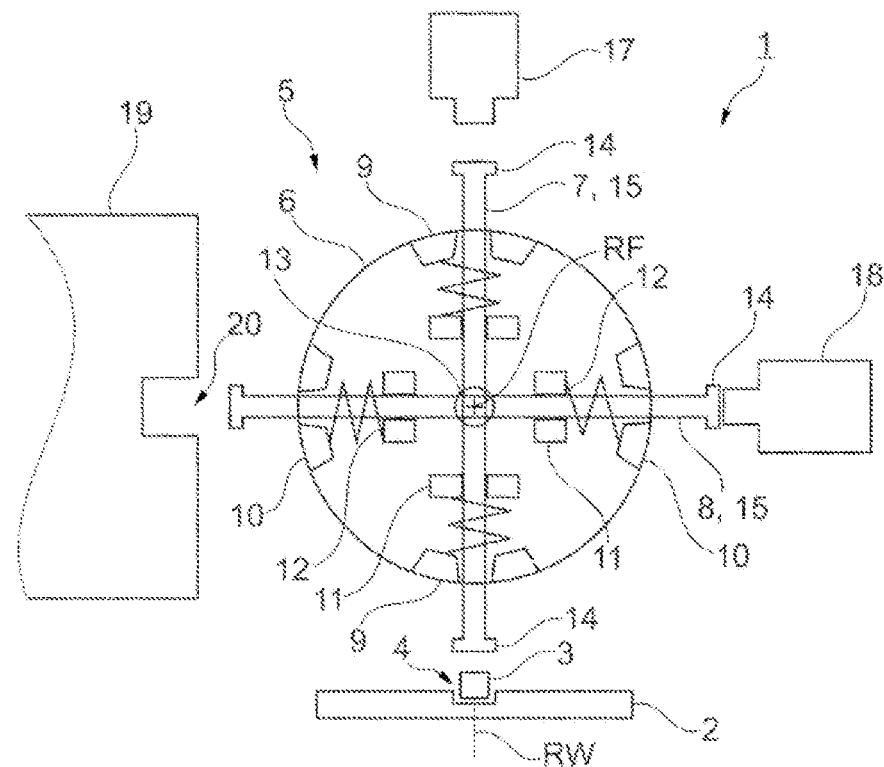
FIG. 1 shows a handling device in a front view.
Figure 2:
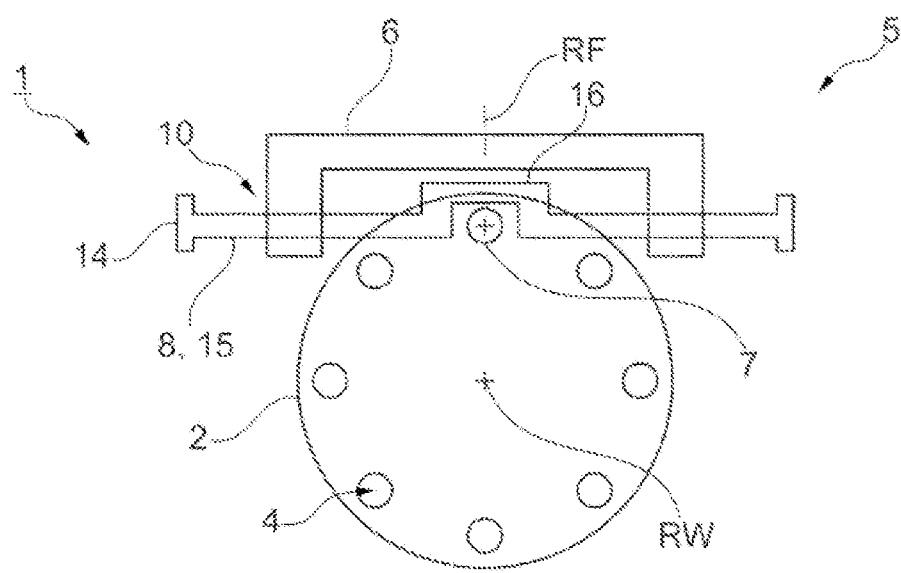
FIG. 2 shows the handling device in a plan view.
Figure 3:
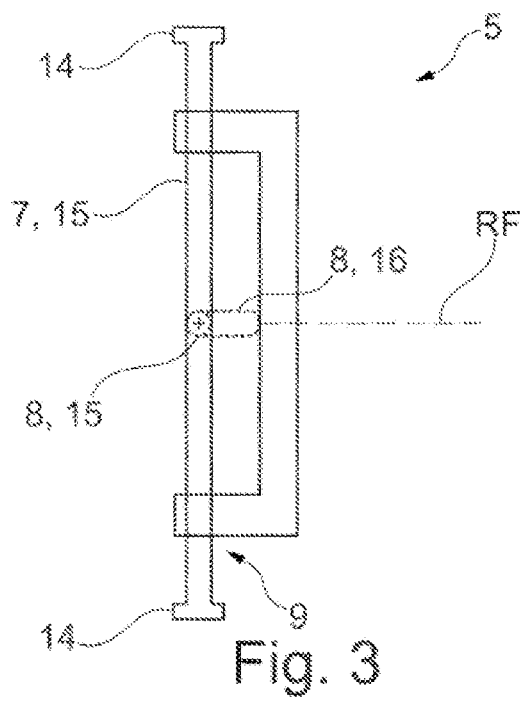
FIG. 3 shows a workpiece-conveying apparatus of the handling device in a side view.

A handling device denoted overall by the reference symbol 1 is provided for transferring workpieces 3 arranged on a workpiece carrier 2 to a storage station 20 of a machine 19, which cannot be assigned to the handling device 1, with the aid of a workpiece-conveying apparatus 5. In the exemplary embodiment, the workpiece carrier 2 has the form of a horizontally arranged rotatable disk, in which receptacles 4 for inserting the workpieces 3 are located. The axis of rotation of the workpiece carrier 2, which is vertically aligned in the exemplary embodiment, is denoted by RW. In an alternative embodiment, not shown, the workpiece carrier 2 can be designed, for example, as a conveyor belt that feeds workpieces 3 to the workpiece-conveying apparatus 5.

The workpieces 3 are in the workpiece carrier 2 in a horizontal orientation. The workpiece-conveying apparatus 5 comprises a turntable 6, which is aligned vertically. The correspondingly horizontally aligned axis of rotation of the workpiece-conveying apparatus 5 is denoted by RF. Furthermore, two feed elements 7, 8 are to be attributed to the workpiece-conveying apparatus 5, which intersect in a front view (FIG. 1) in an X-shape, wherein right angles are enclosed between the feed elements 7, 8. The first feed element 7 is continuously straight, whereas the second feed element 8 is an offset element.

Linear guides 9, 10 on the rotary table 6 are provided for guiding the feed elements 7, 8. Both feed elements 7, 8 are firmly connected to two support rings 11, on which springs 12, namely compression springs designed as helical springs, are supported. The second end of each spring 12 is supported on the turntable 6. A shaft driving the turntable 6 is denoted by 13.

To move the feed elements 7, 8 against the force of individual springs 12, actuators 17, 18 are provided. The actuators 17, 18 are positioned in a stationary manner. Both actuators 17, 18 come into action simultaneously when the workpieces 3 are being conveyed. With regard to the design and function of the feed elements 7, 8 that can be displaced by the actuators 17, 18, reference is made to FIGS. 2 to 5. Each feed element 7, 8 has two end pieces 14, wherein all four end pieces 14 are designed identically. In the case of the first feed element 7, the two end pieces 14 adjoin a continuous, straight rod section 15 of the feed element 7. In the case of the offset feed element 8, on the other hand, the rod section 15 is interrupted by a middle section 16 that is offset relative to it. The center section 16 is dimensioned in such a way that a sufficient displacement path of the second feed element 8 is possible.

Figure 4:
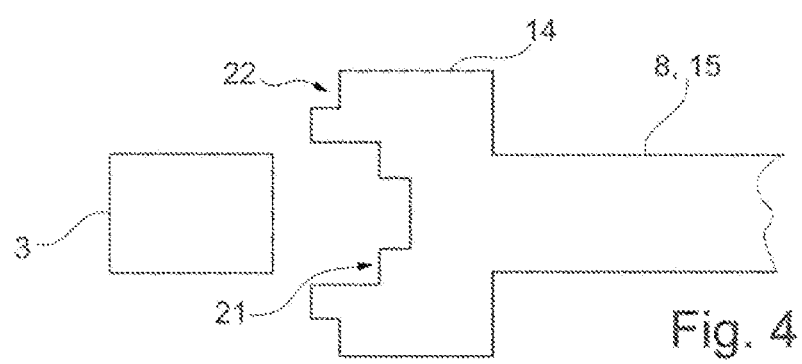
FIGS. 4 and 5 show details of the handling device.
Figure 5:
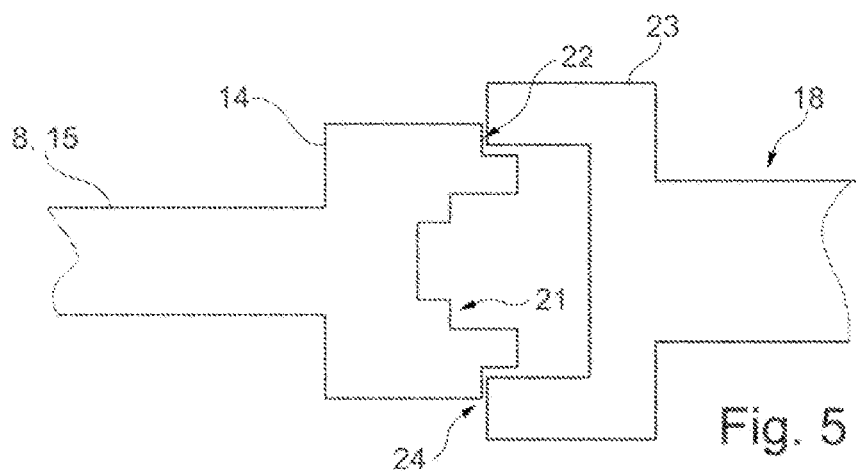

The interaction of an end piece 14 with a workpiece 3 is illustrated in FIG. 4. The end piece 14 has a gripper contour 21 that enables the workpiece 3 to be gripped. The end pieces 14 have the function of vacuum grippers. Optional movable elements, which are arranged on the end piece 14 and enable or support the gripping of the workpiece 3, are not shown.

In addition to the gripper contour 21, the end piece 14 has a connection contour 22 designed to interact with the actuator 17, 18. For this purpose, an end piece 23 of the actuator 17, 18 has a connection contour 24 matched to the connection contour 22 of the end piece 14.

During operation of the handling device 1, when the rotary table 6 is in the position shown in FIG. 1, both actuators 17, 18 are actuated simultaneously. Here, the actuator 17, which moves the first feed element 7, causes a workpiece 3 to be received. At the same time, a workpiece 3 is transferred to the storage station 20 with the aid of the actuator 18, which displaces the second feed element 8. The storage station 20 can be part of a conveying and/or processing device, which can be assigned to the machine 19. In any case, the orientation of the workpiece 3, which is transferred to the storage station 20, is tilted by 90 degrees in relation to the orientation of the workpieces 3 on the workpiece carrier 2. After the workpiece 3 has been transferred to the storage station 20, the turntable 6 is rotated through 90 degrees so that the workpiece 3 previously received with the aid of the actuator 17, now also rotated through 90 degrees, can be transferred to the storage station 20. The number of workpieces 3 transferred per unit of time thus corresponds to twice the cycle frequency of the turntable 6.

REFERENCE NUMERALS

1 Handling device
2 Workpiece carrier, horizontal
3 Workpiece
4 Receiving in the workpiece carrier
5 Workpiece-conveying apparatus
6 Turntable, vertical
7 First feed element, straight
8 Second feed element, offset
9 Linear guide for the first feed element
10 Linear guide for the second feed element
11 Support ring
12 Spring
13 Shaft
14 End piece of the feed element
15 Rod section of the feed element
16 Central section of the offset feed element
17 Actuator
18 Actuator
19 Machine
20 Storage station
21 Gripper contour of the end piece
22 Connection contour of the end piece
23 End piece of the actuator
24 Connection contour of the actuator
RF Axis of rotation of the workpiece-conveying apparatus
RW Axis of rotation of the workpiece carrier

The invention claimed is:

1. A handling device for transferring workpieces, comprising
   a workpiece carrier designed to receive a plurality of workpieces, and
   a rotatable workpiece-conveying apparatus designed to transfer the plurality of workpieces to a storage station, the rotatable workpiece-conveying apparatus:
   being designed to receive each one of the plurality of workpieces in a first angular position from the workpiece carrier and to transfer said one of the plurality of workpieces to the storage station in a second angular position,
   comprising at least two feed elements,
   each one of the at least two feed elements being displaceable linearly along a displacement axis and the displacement axes of the at least two feed elements intersecting in an axis of rotation of the rotatable workpiece-conveying apparatus, wherein:
      a plurality of the at least two feed elements are actuatable simultaneously,
      each one of the least two feed elements is assigned a linear actuator that does not rotate with the rotatable workpiece-conveying apparatus, and
      each one of the at least two feed elements has two end pieces of the same type, each end piece of the two end pieces being suitable for direct interaction with a one of the plurality of workpieces as well as for direct interaction with the linear actuator.

2. The handling device die of claim 1, wherein the axis of rotation of the rotatable workpiece-conveying apparatus is aligned horizontally.

3. The handling device of claim 1, wherein the rotatable workpiece-conveying apparatus has exactly two feed elements intersecting at an angle of 90°.

4. The handling device of claim 3, wherein a one of the exactly two feed elements has a straight shape and the other one of the exactly two feed elements has an offset shape.

5. The handling device of claim 1, wherein the rotatable workpiece-further comprises a plurality of linear guides distributed uniformly on a circumference of the rotatable workpiece-conveying apparatus and provided for guiding the at least two feed elements.

6. The handling device of claim 1, wherein the two end pieces of the at least two feed elements are designed as pneumatic grippers.

7. The handling device of claim 1, wherein the workpiece carrier can be rotated about an axis of rotation that is tilted by 90° in relation to the axis of rotation of the rotatable workpiece-conveying apparatus.

8. A method for transferring workpieces, comprising:
   providing a workpiece-conveying apparatus designed as a rotary indexing-table with a horizontal axis of rotation and two linearly displaceable feed elements intersecting one another on the axis of rotation,
   simultaneously removing a first workpiece in a first angular position from a workpiece carrier by means of a first of the two linearly displaceable feed elements and transferring a similar workpiece in an angular position tilted by 90° by second of the two linearly displaceable feed elements to a storage station, and
   further rotating the rotary indexing table by 90° and receiving a further workpiece from the workpiece carrier by means of the second of the two linearly displaceable feed elements while simultaneously transferring the first workpiece received in the previous step to the storage station by means of the first of the two linearly displaceable feed elements.

9. The method of claim 8, comprising displacing the two linearly displaceable feed elements by means of respective actuators arranged outside of the rotary indexing table in a stationary manner.

10. The method of claim 9, wherein the respective actuators are actuated simultaneously with a non-uniform stroke.

11. A handling device for transferring workpieces, comprising
- a workpiece carrier arranged to receive a plurality of workpieces, and
- a rotatable workpiece-conveying apparatus arranged to receive each one of the plurality of workpieces from the workpiece carrier in a first angular position and to transfer each one of the plurality of workpieces to a storage station in a second angular position, the rotatable workpiece-conveying apparatus comprising:
  - an axis of rotation;
  - a first linearly displaceable feed element;
  - a second linearly displaceable feed element, intersecting the first linearly displaceable feed element at the axis of rotation and simultaneously actuatable with the first linearly displaceable feed element;
  - a first, non-rotatable linear actuator assigned to the first linearly displaceable feed element; and
  - a second, non-rotatable linear actuator assigned to the second linearly displaceable feed element, wherein:
    - the first linearly displaceable feed element comprises a first end piece and a second end piece, each arranged for direct interaction with each one of the plurality of workpieces and with the first, non-rotatable linear actuator; and
    - the second linearly displaceable feed element comprises a third end piece and a fourth end piece, each arranged for direct interaction with each one of the plurality of workpieces and with the second, non-rotatable linear actuator.

12. The handling device of claim 11, wherein the axis of rotation is aligned horizontally.

13. The handling device of claim 11, wherein the first linearly displaceable feed element intersects the second linearly displaceable feed element at an angle of 90°.

14. The handling device of claim 11, wherein:
- the first linearly displaceable feed element has a straight shape; and
- the second linearly displaceable feed element has an offset shape.

15. The handling device of claim 11, wherein:
the rotatable workpiece-conveying apparatus further comprises:
- a first linear guide for guiding the first linearly displaceable feed element; and
- a second linear guide for guiding the second linearly displaceable feed element; and
the first linear guide and the second linear guide are distributed uniformly on a circumference of the rotatable workpiece-conveying apparatus.

16. The handling device of claim 15, wherein:
the rotatable workpiece-conveying apparatus further comprises:
- a third linear guide for guiding the first linearly displaceable feed element; and
- a fourth linear guide for guiding the second linearly displaceable feed element; and
the first linear guide, the second linear guide, the third linear guide and the fourth linear guide are distributed uniformly on a circumference of the rotatable workpiece-conveying apparatus.

17. The handling device of claim 11, wherein each of the first end piece, the second end piece, the third end piece and the fourth end piece is a pneumatic gripper.

18. The handling device of claim 11, wherein the workpiece carrier is rotatable about a carrier axis of rotation arranged at 90° to the axis of rotation.

* * * * *